United States Patent [19]

Sheill

[11] Patent Number: 4,478,317
[45] Date of Patent: Oct. 23, 1984

[54] SLACK ADJUSTER FOR A DISC BRAKE

[75] Inventor: David D. Sheill, Farmington Hills, Mich.

[73] Assignee: Rockwell International Corporation, Pittsburgh, Pa.

[21] Appl. No.: 484,026

[22] Filed: Apr. 11, 1983

[51] Int. Cl.$^3$ .............................................. F16D 65/56
[52] U.S. Cl. .............................. 188/71.9; 188/196 BA
[58] Field of Search .................... 188/71.8, 71.9, 72.8, 188/79.5 K, 196 D, 196 BA, 196 M

[56] References Cited

U.S. PATENT DOCUMENTS 4,374,551 2/1983 Birkenbach et al. ............... 188/71.9
4,399,894 8/1983 Tribe ................................... 188/71.9

FOREIGN PATENT DOCUMENTS 1180137 2/1970 United Kingdom ............... 188/71.9

Primary Examiner—Duane A. Reger

[57] ABSTRACT

A slack adjuster is for a disc brake of the type which includes a disc mounted for rotation about an axle and a caliper brake having a housing mounted on the axle in alignment with a friction surface of the disc. A braking piston is mounted in the housing for axial movement toward and away from the friction surface of the disc. Brake actuation produces rotating movement of a powershaft mounted in the housing which will in turn produce a corresponding axial movement of the braking piston through a non-rotating powershaft nut. An adjusting sleeve is between the piston and the powershaft nut and is threadably coupled to the piston and capable of rotation relative thereto to adjust the axial position of the piston. The adjusting sleeve is capable of rotating in a direction which will cause the piston to be adjusted toward the disc and is prevented from rotating in the opposite direction by a one-way clutch element between the adjusting sleeve and the housing. A lost motion element is between the powershaft and the adjusting sleeve and allows rotation of the powershaft to produce corresponding rotation of the adjusting sleeve after the piston has moved toward the disc through a desired running clearance without having made any frictional contact therewith. The lost motion element employs a force limiting clutch element to prevent corresponding rotation of the adjusting sleeve after the piston makes contact with the friction surface of the disc and when the powershaft is rotated in a direction to produce movement of the piston away from the disc.

7 Claims, 4 Drawing Figures

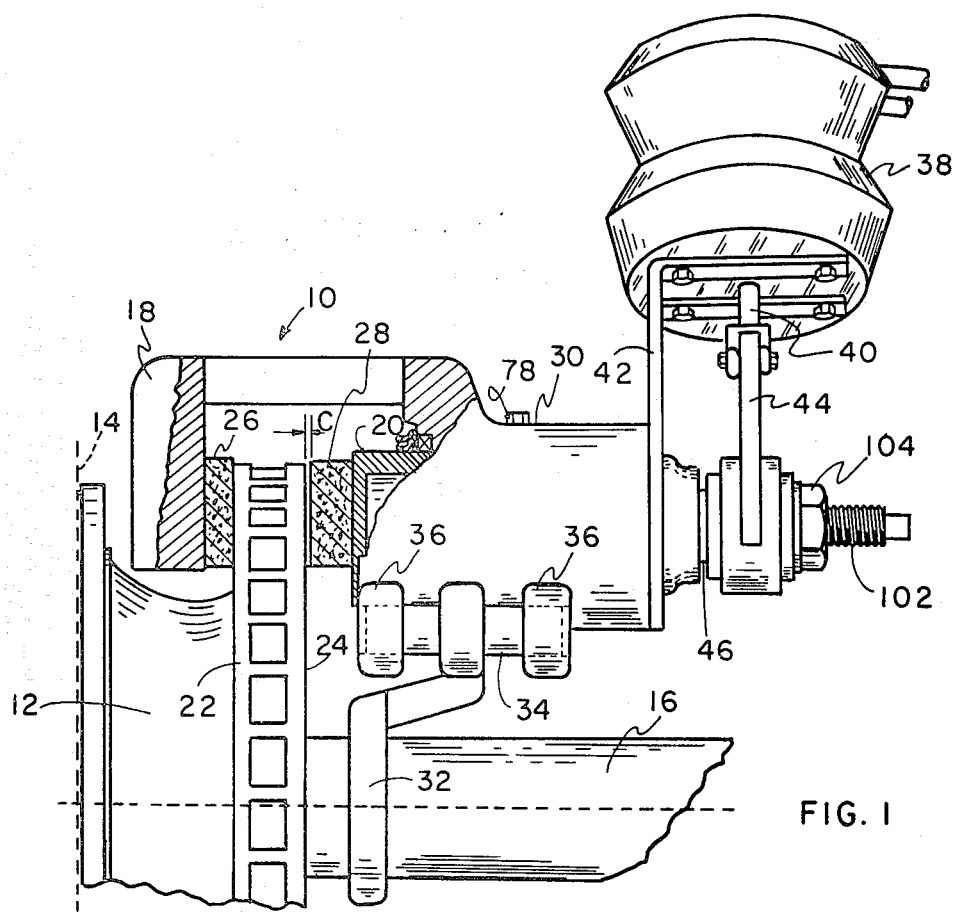
FIG. 1
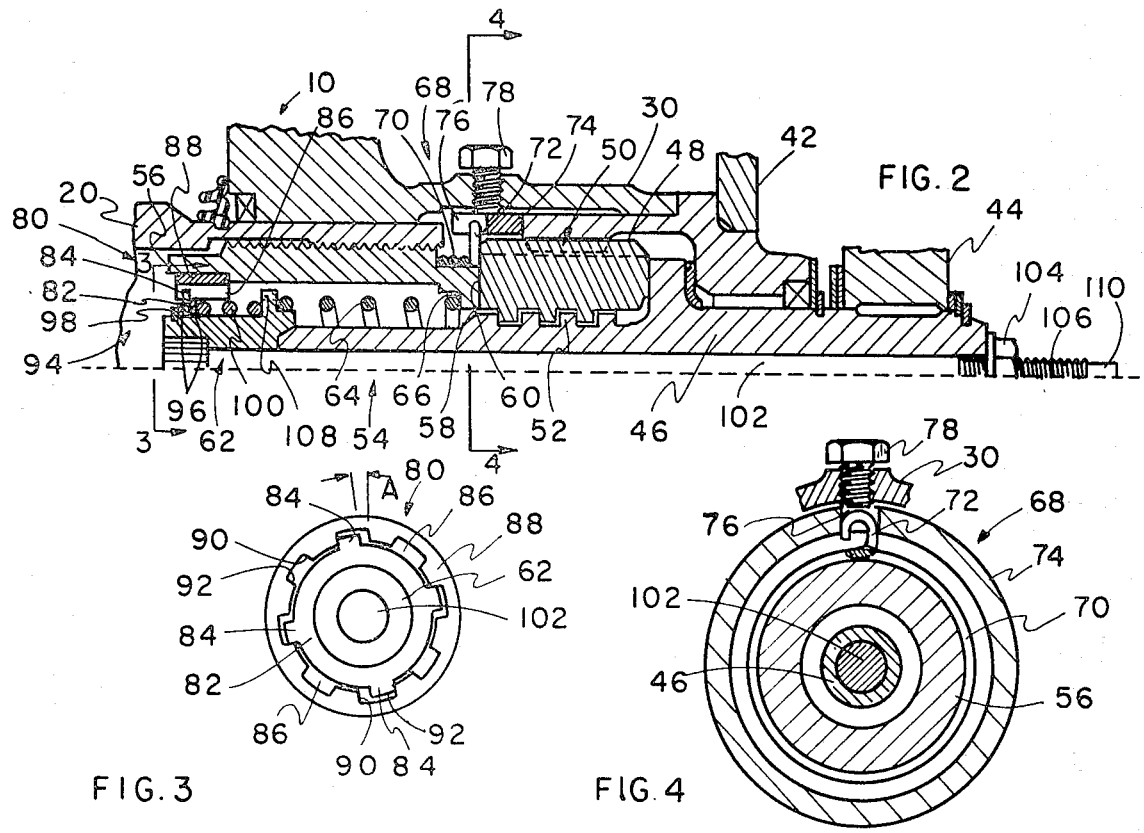
FIG. 2
FIG. 3
FIG. 4 a slack adjuster for a disc brake and, more specifically, to such a slack adjuster which utilizes an adjusting sleeve threadably coupled to the brake piston for rotation relative thereto to adjust the axial position of the piston.

SLACK ADJUSTER FOR A DISC BRAKE

BACKGROUND OF THE INVENTION

1. Field of the Invention.

This invention relates to a slack adjuster for a disc brake and, more specifically, to such a slack adjuster which utilizes an adjusting sleeve threadably coupled to the brake piston for rotation relative thereto to adjust the axial position of the piston.

2. Description of the Prior Art.

One type of disc brake which is well known in the automotive field utilizes a rotating disc or rotor which is mounted for rotation with a wheel. The brake includes a caliper assembly which is mounted on the axle with an extended, outboard portion which overlies the outboard side of the disc and a piston which is aligned with the inboard side of the disc. Axial movement of the piston causes the disc to be entrapped therebetween to produce a frictional force thereon tending to prevent rotation of the disc and wheel.

Both the extended portion and the piston employ brake shoe and friction pad configurations with the friction pads being made of a material which is worn away during the life of the brake as the surface thereon is repeatedly brought into frictional contact with the disc. However, during normal actuation of the brake, it is desirable for the piston to be maintained at a predetermined running clearance from the disc so that application of the brake will be assured after the piston has traveled through the relatively small, predetermined running clearance. With repeated use and extensive wear of the friction pads, it would be possible for the piston to remain at the same position relative to the disc prior to actuation to cause the running clearance to be enlarged sufficiently to prevent quick, reliable brake operation. Such extensive piston movement during actuation could complicate the operation of the actuation means and lengthen the time required to initially apply the brakes. Accordingly, it is not uncommon to employ a slack adjusting means within such a brake which is intended to insure that the running clearance will be maintained within a maximum distance throughout the life of the friction pads to insure that the brake will quickly produce frictional contact with the disc whenever the brake is being actuated.

Although there have heretofore been provided a number of slack adjuster means for insuring that the desired running clearance will be maintained throughout the operating life of such brakes, there remains a need for any slack adjuster which is reliable, effective and relatively simple to maintain.

SUMMARY OF THE INVENTION

It is an object of this invention to provide a slack adjuster for a disc brake which is effective, reliable and relatively simple to maintain.

These and other objects of the invention are provided in a preferred embodiment thereof including a slack adjuster for a disc brake of the type which includes a disc mounted for rotation about an axle and a brake housing mounted on the axle in alignment with a friction surface of the disc. A non-rotatable braking piston is mounted in the housing for axial movement toward and away from the friction surface of the disc. Brake actuation means is mounted on the housing. A powershaft is mounted within the housing, is coaxially aligned with the piston and is capable of selective rotation by the brake actuation means. The powershaft has worm gear teeth thereon engaged with a powershaft nut within the housing which powershaft nut is prevented from rotating and capable of axial movement directly corresponding to the selective rotation of the powershaft. The powershaft nut is operably connected to the piston to produce the axial movement thereof toward and away from the friction surface of the disc. The powershaft is rotated in a first direction during actuation of the brake actuation means to move the piston toward the disc and in a second direction to move the piston away from the disc. The slack adjuster is utilized to maintain a running clearance between the piston and the friction surface of the disc at a predetermined maximum distance when the brake actuation means is not being actuated. The slack adjuster includes an adjusting sleeve threadably coupled to the piston and capable of rotation relative to the piston to adjust an axial position of the piston relative thereto. The adjusting sleeve is rotated in the first direction to cause the piston to be adjusted toward the disc. The adjusting sleeve is biased away from the disc to cause a rearward end thereof remote from the disc to be maintained in contact with a forward end of the powershaft nut. There is included means for preventing rotation of the adjusting sleeve in the second direction. Lost motion means is provided between the powershaft and the adjusting sleeve which allows rotation of the powershaft without corresponding rotation of the adjusting sleeve when the piston moves toward the disc less than the predetermined maximum distance and with corresponding rotation of the adjusting sleeve when the piston moves toward the disc in excess of the predetermined maximum distance. Force limiting clutch means associated with the lost motion means is included to prevent corresponding rotation of the adjusting sleeve when the piston contacts the friction surface of the disc to provide a braking force thereto and when the powershaft rotates in the second direction.

BRIEF DESCRIPTION OF THE DRAWINGS

FIG. 1 is a fragmentary, elevational view, partially in section, of a typical, simplified caliper brake assembly utilizing the preferred slack adjuster.

FIG. 2 is a fragmentary, sectional view of the preferred slack adjuster including various features of the invention.

FIG. 3 is a view as seen along line 3—3 of FIG. 2.

FIG. 4 is a view as seen along line 4—4 of FIG. 2.

DETAILED DESCRIPTION OF THE PREFERRED EMBODIMENT

As seen in FIG. 1, a typical caliper disc brake 10 utilizes a disc or rotor 12 which is rigidly mounted on a wheel 14 or the like. The wheel 14 is mounted for rotation about an axle 16 which could be a trailer axle or a drive axle for a truck or tractor. The caliper brake 10 includes an extended portion 18 and a non-rotating, axially movable braking piston 20 which are respectively aligned with an outboard friction surface 22 and an inboard friction surface 24 of the disc or rotor 12. Both the extended portion 18 and the movable piston 20 respectively employ shoes and friction pads 26 and 28 to produce frictional contact with the opposite sides of the disc 12.

Although only the piston 20 is intended to move within a housing 30 of the caliper brake 10, the method used to produce movement of the piston 20 and to mount the brake 10 on the axle 16 insures that a braking force is applied to the opposite sides of the disc 12. Specifically, the housing 30 of the brake 10 is mounted on a torque plate 32 which is rigidly secured to the axle 16. The torque plate 32 includes a pair (only one shown in FIG. 1) of caliper slide pins 34 which are each rigidly supported at an intermediate portion thereof with its opposite ends extending axially therefrom. At each side of the the housing 30, a pair of axially spaced supports 36 are provided co-axially aligned holes therethrough for receipt of the opposite ends of the caliper slide pin 34 therein. Accordingly, the entire housing 30 of the brake 10 is capable of moving axially relative to the axle 16 and the disc 12.

To produce the axial movement of the brake piston 20, a preferred brake actuation means includes an air chamber 38 which has an actuation rod 40 extending therefrom. The air chamber 38 is rigidly mounted to the housing 30 by a bracket 42 for movement therewith. The actuation rod 40 is coupled to an actuation arm 44 so that inward and outward movement of the rod 40 will produce rotating movement of the arm 44. The actuation arm 44 is secured to a powershaft 46 and it will be seen that rotation of the powershaft 46 will produce corresponding axial movement of the piston 20.

Accordingly, as the brake 10 is being actuated, the actuation rod 40 will produce rotating movement of the actuation arm 44 and outward movement of the piston 20 until the friction pad 28 thereon is brought into contact with the inboard surface 24 of disc 12. If the friction pad 26 on the extended portion 18 is not in contact with the outboard surface 22 of the disc 12, continued movement of piston 20 will cause the entire housing 30 to be moved axially on the caliper slide pins 34 until both friction pads 26 and 28 apply a compressive force on the disc 12 to produce the desired braking friction at both sides thereof. Although exaggerated for the purposes of demonstration and shown at only one side of the disc 12, a normal, predetermined running clearance C is desired to insure that only minimal axial movement of the piston 20 is required to insure that there is full braking force being applied to the disc 12. Obviously, as the usable material of the friction pads 26 and 28 begins to wear away, there is a concern that the running clearance C will be enlarged to a degree which will interfere with quick, reliable braking operation. In the extreme, if the clearance between the friction pads 26 and 28 and the disc 12 were to be quite large, the angle of rotation required for corresponding movement of the actuation arm 44 would be too great for proper operation of the air chamber 38 and actuation rod 40. In fact, there are some prior art slack adjusting means which operate in the actuation arm area and are intended to relocate the arm 44 relative to the powershaft 46 during the operational life of the brake 10. However, in the slack adjuster of the present invention, the adjustment required during the effective life of the brake 10 occurs internally so that a slack adjusting element on the actuation arm is unnecessary and the less complicated actuation arm 44 is all that is required.

As seen in FIG. 2, the powershaft 46 is mounted for rotation within the housing 30 and is coaxially aligned with the piston 20. With the actuation arm 44 splined to the powershaft 46, it is capable of being selectively rotated within the housing 30. To convert the rotational movement to axial movement as required for applying the braking force with the piston 20, a powershaft nut 48 is mounted within the housing and is capable of axial movement therein but prevented from rotation by being keyed or splined to the housing 30 as at 50. Worm gear teeth 52 on the powershaft 46 engage with matching internal teeth of the powershaft nut 48 and insure that the powershaft nut 48 will move axially in direct correspondence to the selective rotation of the powershaft 46.

As seen in FIG. 2, the brake is in a non-actuated position with the actuation rod 40 fully retracted within the air chamber 38. In this position, the powershaft nut 48 is fully withdrawn from the disc 12 to be located against further movement to the right. During actuation of the brake, the powershaft 46 would be rotated clockwise, when viewed from the left, and the powershaft nut 48 would be moved axially to the left toward the disc 12. As thus described, the brake 10 includes a means for actuation which is well known in the prior art if the piston 20 were directly coupled to the powershaft nut 48 for corresponding movement therewith.

However, in the preferred embodiment, a slack adjuster 54 is operably employed between the powershaft nut 48 and the piston 20 to maintain the running clearance C as described above at a predetermied maximum distance when the brake is not being actuated. The slack adjuster 54 includes an adjusting sleeve 56 which is threadably coupled to the piston 20 and capable of rotating relative to the piston 20 to adjust the axial position of the piston 20 relative thereto. The adjusting sleeve 56 and piston 20 include threads thereon which are arranged to insure that when the adjusting sleeve 56 is rotated in the clockwise direction when viewed from the left, the piston 20 will be adjusted to the left toward the disc 12. To insure that the adjusting sleeve 56 and the piston 20 move axially in response to the axial movement of the powershaft nut 48, there is provided means for biasing the adjusting sleeve 56 away from the disc 12 to cause a rearward end 58 thereof remote from the disc 12 to be maintained in contact witn a forward end 60 of the powershaft nut 48. Specifically, an extended end portion 62 of the powershaft 46 supports a spring 64 which acts against an interior surface 66 of the adjusting sleeve 56 to apply a force to the right throughout brake operation.

Since the slack adjuster 54 is intended to cause relative movement of the piston 20 toward the disc 12 as the friction pads 26, 28 become worn away, during normal operation it is only desirable for the piston 20 to be axially adjusted to the left. Accordingly, there is provided means for preventing rotation of the adjusting sleeve 56 in a counter-clockwise direction when viewed from the left which would tend to retract the piston 20 thereon. To prevent rotation in the counter-clockwise direction, a one-way clutch means 68 is provided between the adjusting sleeve 56 and the housing 30. The one-way clutch means 68 includes a helical spring clutch 70 which extends around the adjusting sleeve 56 and has one end 72 which is anchored relative to the housing 30. As seen in FIGS. 2 and 4, a collar 74 is mounted within the housing 30 to encircle the adjusting sleeve 56. The collar 74 has an opening 76 therein for receipt of the end 72 of the spring clutch 70. A set screw 78 is threaded into an opening in the housing and can be selectively threaded inwardly to create gripping contact with the exterior surface of the collar 74 and, during normal brake operation, will be maintained in an inward position to prevent rotation of the collar 74. As thus described, the one-way clutch 68 utilizes the helical spring clutch 70 to prevent rotation in a counter-clockwise direction when viewed from the left in a manner which is well known in the brake art.

To axially adjust the piston 20 relative to the adjusting sleeve 56 when the preferred running clearance C is being exceeded, a means must be provided for selective rotation of the adjusting sleeve 56 in the clockwise direction. This is accomplished in the preferred slack adjuster 54 with a lost motion means 80 which is installed on the end portion 62 of the powershaft 46. The lost motion means 80 is intended to allow rotation of the powershaft 46 without corresponding rotation of the adjusting sleeve 56 when the piston 20 moves toward the disc 12 less than the predetermined maximum distance. However, the rotation of the powershaft 46 should produce corresponding rotation of the adjusting sleeve 56 when the piston moves toward the disc 12 in excess of the predetermined maximum distance. To provide this function, the lost motion means 80 includes a disc element 82 which is mounted on the end portion 62 and has at least one tooth element 84 thereon which extends toward the adjusting sleeve 56. The preferred adjusting sleeve 56 includes a plurality of recesses 86 in an interior portion 88 thereof which recesses 86 are capable of receiving the tooth elements 84 therein. Each recess 86 is defined by opposed walls 90, 92 with a predetermined space therebetween equal to the width of a tooth element 84 plus an angular clearance space A corresponding to the predetermined maximum distance which is desired for the running clearance C. Therefore, as seen in FIG. 3, the brake 10 is shown in the non-actuated position and in a condition for rotation in a clockwise direction during actuation of the brake 10. When the brake is actuated, the end portion 62 of the powershaft 46 will rotate in a clockwise direction and each tooth element 84 will be reoriented within its corresponding recess 86. If the piston 20 travels a distance less than the predetermined maximum distance, the angular movement of the powershaft 46 will be less than the angular space A and there will be no contact of the tooth element 84 with the wall 90 defining the recess 86. However, if the pads 26, 28 are sufficiently worn, the movement of the piston 20 will exceed the predetermined maximum distance and contact of the tooth element 84 with the wall 90 will produce corresponding rotation of the adjusting sleeve 56. As the adjusting sleeve 56 is so rotated, the piston 20 will be axially repositioned thereon in an effort to reduce the running clearance to the desired distance.

Although it is desirable for the lost motion means 80 to impart a corresponding rotation to the adjusting sleeve 56 in the manner described hereinabove, there are occasions when a fixed, rigid coupling between the powershaft 46 and the adjusting sleeve 56 would be undesired and could damage one or the other of these components. Specifically, as the piston 20 is adjusted forward for contact with the friction surface 24 of the disc 12 to provide a braking force thereto, the primary braking force is still being provided by the powershaft nut 48. As the powershaft nut 48 is being fully moved into an axial position by the powershaft 46 to provide the primary braking force, there should not be a direct coupling between the powershaft 46 and the adjusting sleeve 56. Additionally, after the brake 10 is fully actuated and contact between the tooth 84 and the wall 90 has resulted in rotation of the adjusting sleeve 56, the powershaft 46 will be rotated through a sufficient return angle to cause the tooth 84 to contact the opposite wall 92. Obviously, any rigid coupling with the powershaft 46 during its counter-clockwise rotation as it returns to the non-actuated position would be undesirable since the one-way clutch means 68 would prevent any rotation of the adjusting sleeve 56 in a counter-clockwise direction. Of course, the one-way clutch means 68 is specifically intended to prevent undesired rotation of the adjusting sleeve 56 in the counter-clockwise direction to prevent it from repositioning the piston 20 away from the disc 12. Accordingly, there is provided a force limiting clutch means 94 which is associated with the lost motion means 80 which is intended to prevent corresponding rotation of the adjusting sleeve 56 when the piston 20 contacts the friction surface 24 of the disc 12 to provide a braking force thereto and when the powershaft 46 rotates in the counter-clockwise direction. The force limiting clutch feature is provided by the manner in which the disc element 82 is installed on the end portion 62 of the powershaft 46. Specifically, the disc element 82 is mounted between a pair of washers 96 and is prevented from being removed from the end of the end portion 62 by a snap ring 98. A spring 100 is mounted on the extended end portion 62 to apply a compressive force through the washers 96 to the disc element 82 tending to cause it to rotate with the powershaft 46. However, the frictional mounting of the disc element 82 in this manner allows force to be applied to rotate the adjusting sleeve 56 in the manner described and prevents the rigid coupling of the powershaft 46 and the adjusting sleeve 56 when it is not desired.

As thus described, the preferred slack adjuster 54 will automatically adjust the running clearance during operation of the brake after new friction pads 26, 28 are installed until they are in a worn condition for replacement. However, when the friction pads must be replaced, the adjusting sleeve 56 must be rotated in a counter-clockwise direction to retract the piston 20 but a means must be provided for accomplishing this rotation manually and for preventing any interference with such rotation which would exist during normal braking operation.

To provide for the manual slack adjustment of the brake 10, the preferred slack adjuster 54 utilizes a manual adjusting rod 102 which extends through an axial hole in the powershaft 46. Specifically, the rod 102 has an inward end thereof which supports the end portion 62 of the powershaft 46 and tends to maintain the end portion 62 rigidly thereon as a nut 104 is fully threaded on the exterior end 106 of the rod 102. However, when manual adjustment is desired, the nut 104 is unthreaded to be moved to the right as viewed in FIG. 2. When this is accomplished, the rod 102 can be extended inwardly within the powershaft 46 to cause the end portion 62 to be moved to the left. The end portion 62 wil' be maintained in an axial position on the rod 102 by the biasing action of the spring 64. As the end portion 62 moves to the left, the disc element 82 and teeth element 84 thereon are disengaged from the recesses 86 of the adjusting sleeve 56. Continued movement to the left, however, will bring a toothed region 108 of the end portion 62 in alignment with and in engagement with the recesses 86. When the rod 102 has been so positioned to the left, a tool may be employed on the working surfaces 110 thereof to cause rotation of the rod 102 independent of the powershaft 46. With the toothed region 108 engaged with the recesses 86, rotation of the rod 102 will produce corresponding rotation of the adjusting sleeve 56. However, since the most significant reason for using this means for manual adjustment of the adjusting sleeve 56 includes rotation in a counter-clockwise direction to retract the piston 20, a means must be employed to prevent the operation of the one-way clutch 68. The set screw 78 and ring 74 have been provided for this purpose and loosening of set screw 78 will allow free rotation of the entire ring 74 even though the adjusting sleeve 56 will not be capable of rotating in a counter-clockwise direction relative to the spring clutch 70.

After full retraction of the piston 20 in this manner, new friction pads 26, 28 can be installed. The manual adjusting rod 102 can then be used to produce clockwise rotation of the adjusting sleeve 56 until initial contact is made with the disc 12. After contact has been determined, the rod 102 can be slightly turned to produce an initial running clearance and the nut 104 can be fully installed as shown in FIG. 2 to reposition the end portion 62 relative to the remainder of the powershaft 46. When this is accomplished, the teeth element 84 will be returned to engagement with the recesses 86 for automatic slack adjustment. Additionally, the set screw 78 is returned to a position to secure the collar 74 and allow the one-way clutch 68 to again prevent rotation of the adjusting sleeve 56 in the counter-clockwise direction. It should be noted than the method of rigidly securing the collar 74 relative to the housing 30 is independent of the specific angular orientation of the collar 74 and it can be secured in any angular position to provide the one-way clutch feature.

Although the embodiment as described hereinabove is the preferred, any number of alterations could be made thereto without departing from the spirit of the invention as claimed.

I claim:

1. A slack adjuster for a disc brake of the type which includes a disc mounted for rotation about an axle, a brake housing mounted on said axle in alignment with a friction surface of said disc, a non-rotatable braking piston mounted in said housing for axial movement toward and away from said friction surface of said disc, brake actuation means mounted on said housing, a powershaft mounted within said housing co-axially aligned with said piston and capable of selective rotation by said brake actuation means, said powershaft having worm gear teeth thereon engaged with a powershaft nut within said housing which said powershaft nut is prevented from rotating and capable of axial movement directly corresponding to said selective rotation of said powershaft, said powershaft nut being operably connected to said piston to produce said axial movement thereof toward and away from said friction surface of said disc, said powershaft being rotated in a first direction during actuation of said brake actuation means to move said piston toward said disc and in a second direction to move said piston away from said disc, and said slack adjuster being utilized to maintain a running clearance between said piston and said friction surface of said disc at a predetermined maximum distance when said brake actuation means is not being actuated, said slack adjuster comprising:

an adjusting sleeve threadably coupled to said piston and capable of rotation relative to said piston to adjust an axial position of said piston relative thereto, said adjusting sleeve being rotated in said first direction causing said piston to be adjusted toward said disc;

means for biasing said adjusting sleeve away from said disc to cause a rearward end thereof remote from said disc to be maintained in contact with a forward end of said powershaft nut;

means for preventing rotation of said adjusting sleeve in said second direction;

lost motion means between said powershaft and said adjusting sleeve, said lost motion means allowing rotation of said powershaft without corresponding rotation of said adjusting sleeve when said piston moves toward said disc less than said predetermined maximum distance and with corresponding rotation of said adjusting sleeve when said piston moves toward said disc in excess of said predetermined maximum distance; and force limiting clutch means associated with said lost motion means preventing said corresponding rotation of said adjusting sleeve when said piston contacts said friction surface of said disc to provide a braking force thereto and when said powershaft rotates in said second direction.

2. The slack adjuster as set forth in claim 1, wherein said means for preventing rotation of said adjusting sleeve in said second direction includes one-way clutch means between said adjusting sleeve and said housing.

3. The slack adjuster as set forth in claim 2, wherein said one-way clutch means includes a helical spring clutch around said adjusting sleeve and having an end anchored relative to said housing.

4. The slack adjuster as set forth in claim 3, wherein said end of said spring clutch is secured to a collar mounted in said housing and encircling said adjusting sleeve, said collar being selectively secured against rotation relative to said housing.

5. The slack adjuster as set forth in claim 4, wherein collar can be released to allow said rotation relative to said housing to allow manual, unrestricted rotation of said adjusting sleeve in said first direction and said second direction for initial adjustment of said axial position of said piston relative thereto.

6. The slack adjuster as set forth in claim 1, wherein said lost motion means includes at least one tooth element extending from said powershaft toward said adjusting sleeve, said tooth element being received within a recess of said adjusting sleeve, said recess having opposite walls with a predetermined space therebetween equal to a width of said tooth element plus a clearance space corresponding to said predetermined maximum distance.

7. The slack adjuster as set forth in claim 6, wherein said force limiting clutch means includes said tooth element being mounted for rotation about said powershaft and friction force means being applied to said tooth element tending to prevent said rotation about said powershaft.

* * * * *